United States Patent [19]
Dragone

[11] Patent Number: 6,023,544
[45] Date of Patent: Feb. 8, 2000

[54] MONITORING WITH AN OPTICAL WAVELENGTH ROUTER

[75] Inventor: Corrado Dragone, Little Silver, N.J.

[73] Assignee: Lucent Technologies Inc., Murray Hill, N.J.

[21] Appl. No.: 08/998,354

[22] Filed: Dec. 24, 1997

[51] Int. Cl.[7] ........................................... G06B 6/28
[52] U.S. Cl. ................................. 385/37; 385/24
[58] Field of Search ....................... 385/15, 24, 27, 385/37

[56] References Cited

U.S. PATENT DOCUMENTS

| | | | |
|---|---|---|---|
| 5,136,671 | 8/1992 | Dragone | 385/46 |
| 5,483,369 | 1/1996 | Darcie et al. | 359/126 |
| 5,617,234 | 4/1997 | Koga et al. | 359/131 |
| 5,751,872 | 5/1998 | Bissessur et al. | 385/37 |

OTHER PUBLICATIONS

Fabrication of Multiwavelength Simulataneous Monitoring Device Using Arrayed–Waveguide Grating K. Okamato et al. Electronic Letters Mar. 14, 1996 vol. 32 No. 6 pp. 569–570.

*Primary Examiner*—John D. Lee
*Assistant Examiner*—Victoria D. Hao

[57] ABSTRACT

Monitoring of the wavelength and power in an optical network is realized by including a wavelength router in which output ports at particular locations are included to derive samples for the monitoring. A periodic variation in the optical length of the arms of the grating in the router is used to focus additional power at these selected locations. Such a router can also be used for multiplexing and demultiplexing optical signals.

10 Claims, 11 Drawing Sheets

SPECIFIED WAVELENGTH

MONITORING WITH AN OPTICAL WAVELENGTH ROUTER

FIELD OF THE INVENTION

This invention relates to optical networks and more particularly to apparatus for combining and/or dividing power supplied to it from one or more inputs and supplying it to one or more outputs. Apparatus of this level is useful both in multiplexing and demultiplexing a plurality of different signals and in monitoring the amplitude level and wavelength of signal power sources.

BACKGROUND OF THE INVENTION

An important function that must be provided in high quality optical networks is that of monitoring the status of individual channels of the network. Typically efficient optical transmission systems use a number of channels, each supplied by a laser of a particular wavelength, and such channels are combined for transmission over a common transmission waveguide, such as a broad-band optical fiber.

In such a network, it is necessary to measure the wavelength of the laser providing the light beam that serves to make a particular channel unique, for example to insure that the wavelength difference between adjacent wavelength channels is sufficient to permit reliable separation of the channels. Also it is generally necessary to measure the power level of the signal to insure that it remains high enough to provide a signal-to-noise ratio sufficient to provide reliable fidelity of transmission.

A common technique for doing the desired monitoring is to periodically sample the wavelength and the power level of the signal in a particular channel to make sure these are within the design parameters.

An important tool for combining and separating signals of various channels in wavelength-division multiplexing optical systems has been the wavelength router. The wavelength router may be viewed ideally as an arrangement for producing a wavelength dependent matching between an input signal applied to an input port of an input reference circle and an output signal derived from an output port at an output reference circle.

The basic geometry of a wavelength router includes a first free-space slab component, such as a star coupler, configured to receive radiation from various input ports spaced therearound, and a second similar free-space slab component configured for transmitting radiation applied to its various inports to various output ports spaced therearound. An optical grating comprising an array of waveguides, or arms, couples the two free-space slabs. Generally the length of adjacent arms of the grating differs by a constant amount and the arms are uniformly spaced apart along the boundaries of the free-space slabs. The number of arms included in the grating is dependent on the number of channels in the signals, and is generally at least several times the number of channels. Ordinarily there will be at least twenty arms in a router and typically more than thirty, and often more than one hundred.

Typically, a router will have an input port that is supplied by an optical fiber carrying a plurality of different wavelength channels. These channels will be separated and transferred to different output ports, allowing them to be transported to different destinations. Moreover, the router may be provided with a plurality of input ports, each connected to a separate fiber carrying a number of wavelength channels, for distribution of the channels to output ports.

As is known, various different transfer characteristics can be realized in a router between the input ports and the output ports depending on the wavelengths of the signals and the spacings and dimensions of the input and output waveguides involved.

Additionally wavelength routers of the kind described might be used for time-division multiplexing a plurality of signals, all of the same wavelength, that are supplied to different input ports, appropriately spaced in time, to be available at a common output port appropriately multiplexed.

SUMMARY OF THE INVENTION

In one form, the present invention involves the creation in the output reference circle normally associated with a router of additional images that can be abstracted by output ports positioned appropriately. Such abstracted power can then be used to monitor either the wavelength or the level of the useful signal power.

In particular, to create such additional images, the lengths of the arms of the grating are modified to change the phase shift produced by the s-th arms of the grating by a function, to be termed the phase-shift factor function, that contains a sinusoidal phase variation with an amplitude $\alpha$ and a period P. This length variation between successive arms of the grating will create additional images that in turn produce side lobes in the router's transfer function, to be described as the transmission coefficient. The energy in these side lobes can be captured by appropriately locating additional ports in the output reference circle for use in the desired monitoring. Moreover, by appropriate choice of the amplitude $\alpha$ of the sinusoidal variation, either one or two of the side lobes can be made to have significant power. In particular, the power in the extra lobes can be made comparable to that of the main lobe, with a corresponding reduction of power in the main lobe.

Accordingly, from one aspect the invention is a wavelength router that includes input and output free-space slabs, such as are provided by a star coupler, between which is connected a grating made up of an array of waveguide arms, the length of successive arms of the array having a prescribed variation containing an essentially sinusoidal component for creating additional lobes at the output free-space slab, when an input signal is applied to the input free-space slab. Output ports are connected to capture the energy of these additional lobes and such energy is used for the desired monitoring. Moreover, by appropriate choice of the period P and the amplitude $\alpha$ of the sinusoidal variation, the capture of the energy of the additional lobes is optimized.

In another form, the invention comprises a wavelength router whose input free-space slab is supplied with signals from a plurality of input ports spaced apart and whose output free-space slab includes one or more output ports appropriately spaced apart and the grating connected therebetween is designed so that signal power of a given wavelength from one or more input ports can be efficiently abstracted at one or more of the output ports. Such a router can be used in multiplexing systems.

The invention will be better described from the following more detailed description taken in conjunction with the accompanying drawings.

DETAILED DESCRIPTION OF THE INVENTION

Figure 1:
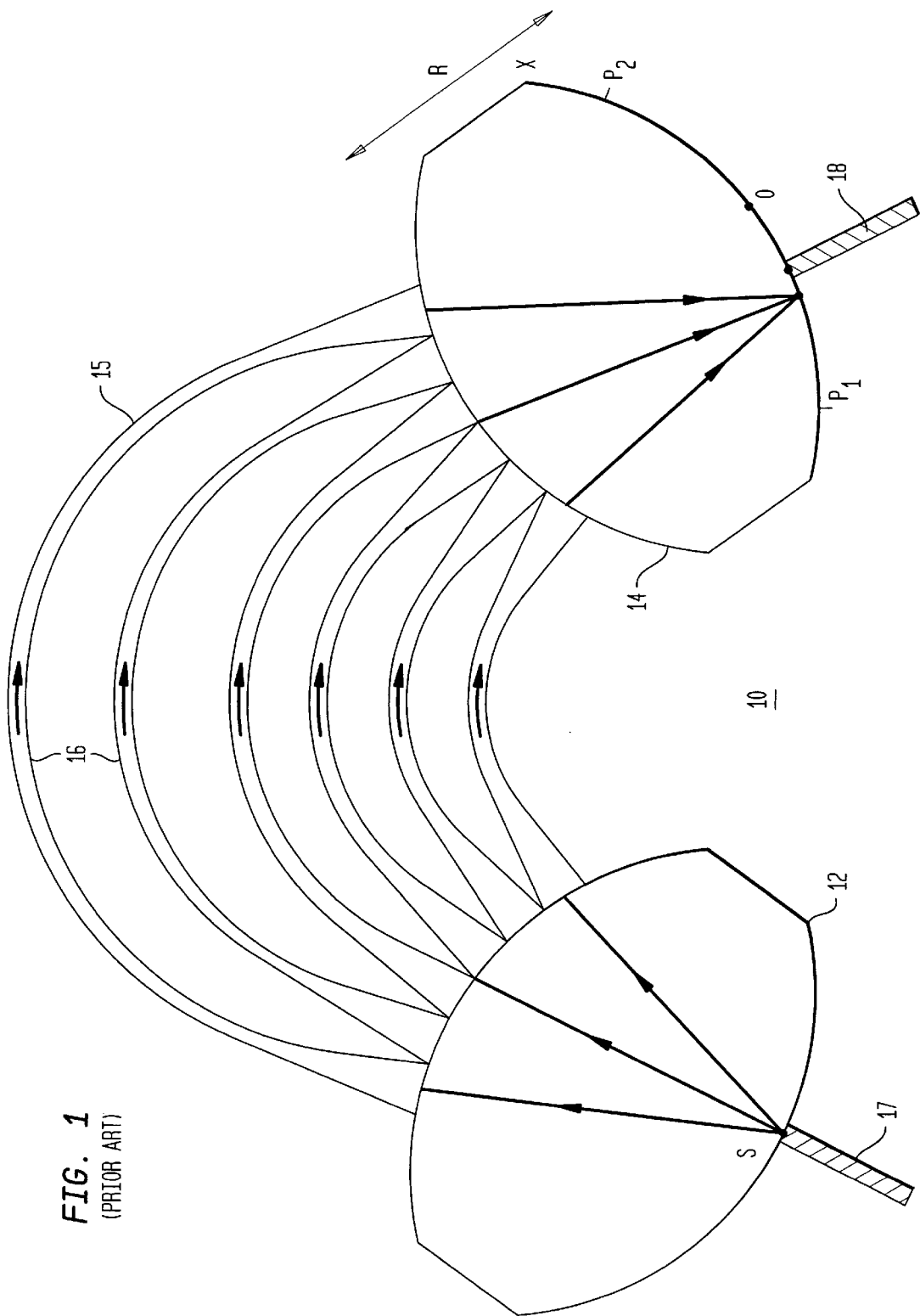
FIG. 1 illustrates the basic form of the prior art form of optical wavelength router.

FIG. 1 shows the basic structure of a wavelength router 10 of the form used in the invention. It includes an input section 12 and an output section 14 spaced apart and interconnected by a grating 15 including an appropriate plurality of optical waveguide arms 16. The input and output sections typically are each free space slabs, such as star couplers, that have the property that wave energy applied thereto at an input port 17 can be abstracted at any of a plurality of output ports 18, of which only one is shown in FIG. 1. The optical waveguide arms 16 typically are thin narrow layers of silica supported on a planar silicon wafer, as known in the art.

The input and output ports are connected to the input and output sections 12 and 14 along portions of two circles that are typically referred to as the input and output circles.

The result is an imaging arrangement consisting of a waveguide grating producing a wavelength dependent output image of each input signal. The location of each output image is determined by its wavelength $\lambda$ and, therefore, signals of different wavelengths from a particular input port give rise to separate images that can be received by different output ports. Typically optical fibers are used for applying input signals to the input ports and for abstracting output signals from the output ports. For simplicity, FIG. 1 shows only two ports. In practice, N output ports will be needed, if the router is to send signals to N different destinations. Similarly, M input ports will be needed, in order to receive signals from M different inputs. In wavelength division optical networks, the different channels would involve different wavelengths. In time division multiplexing, the different channels would involve different time slots.

In FIG. 1, the input signal radiated from the input waveguide 17 at a particular wavelength is radiated from the waveguide location towards the receiving apertures of the arms 16 forming the grating 15. As discussed earlier, there would be an appropriate number S of arms in the grating. Each arm receives a component of the input signal. The signal is therefore split into many components, each traveling along a particular arm. Each arm applies to its component an appropriate phase shift, proportional to the optical path length of the arm. In a conventional router, successive arms are characterized to a good approximation by a constant path length difference. Then, one finds that the various signal components of a signal from an input port, radiated by the arms towards the output circle, all add in phase at certain locations on the output circle 20 shown in FIG. 2. As a result, several images $A_0$, $A_1$, $A_2$ of the input signal are produced on the output circle. These images represent different orders of the grating. They are equally spaced, and they have different intensities. Their spacing $d_0$ is determined by the spacing $a_0$ of the arms radiating apertures, $$d_0 = \frac{R\lambda}{a_0} \qquad \text{Equation (1)}$$

where R is the distance of the radiating apertures from the arms' focal point O. The phase shifts produced by the various arms are wavelength dependent. Therefore, by varying the wavelength, the locations of the output images $A_0$, $A_1$, $A_2$ will vary along the output circle. Of greatest importance in a conventional router is the central image $A_0$, of zero order, since it has the highest intensity. It is the image closest to the central point O corresponding to the focal point of the arms. This image is produced inside the central zone, which is an interval of width $d_0$ centered at O. The remaining images (higher orders)

$A_1$, $A_2$, etc.

are produced in adjacent zones, of the same width. They typically have negligible intensity in all cases except when they are close to the boundaries of the central zone.

Figure 2:
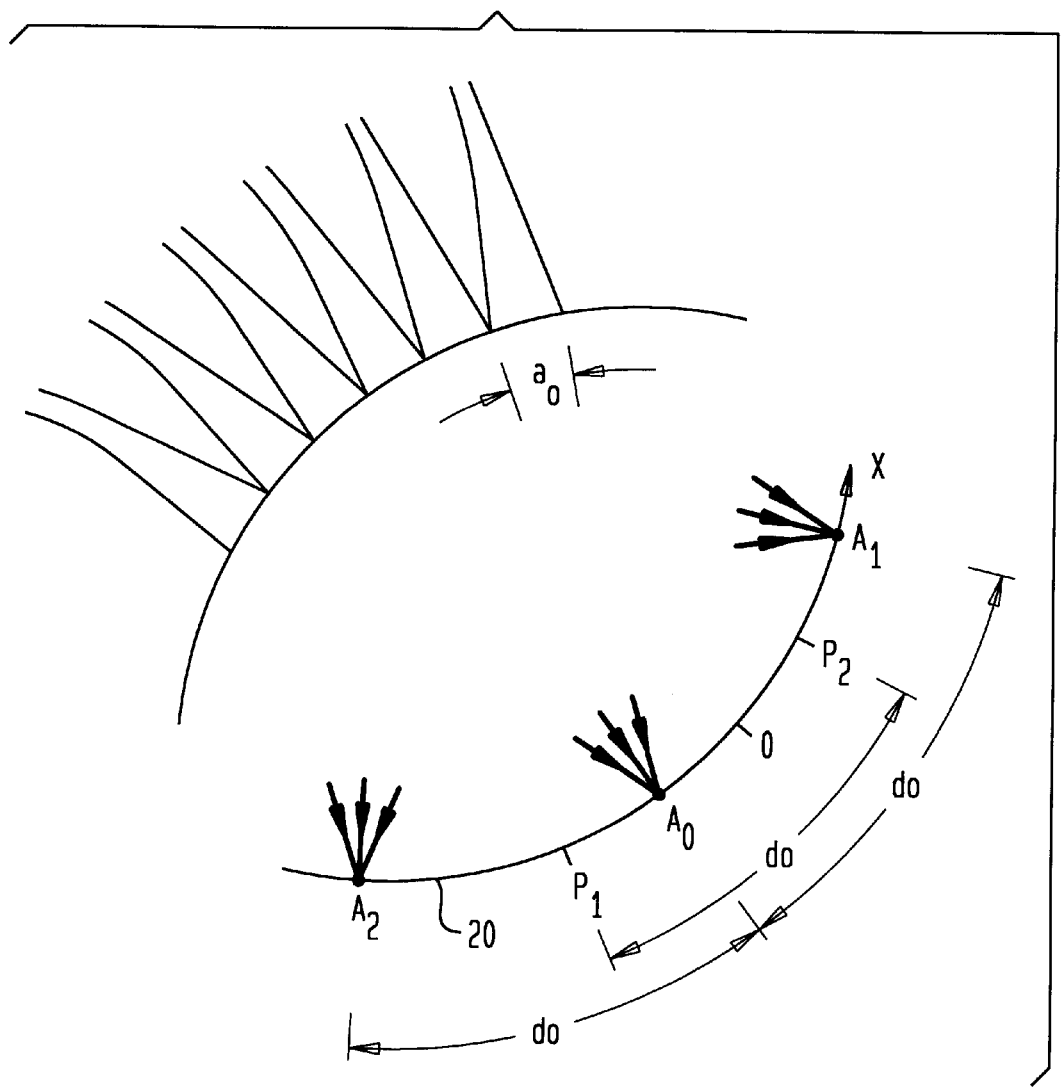
FIGS. 2, 3 and 4 illustrate output characteristics of the basic wavelength router shown in FIG. 1.
Figure 3:
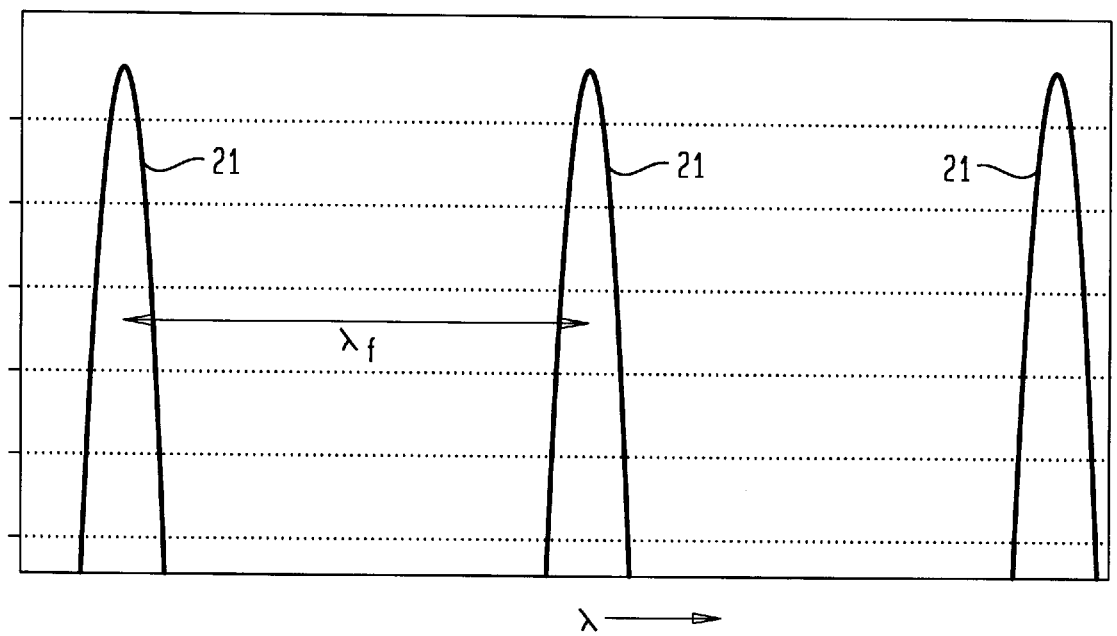

In a conventional router, all the output ports or waveguides are located inside the central zone (which in FIG. 2 represents the field of view $P_1$ $P_2$ of the router) and receive only the images produced in the central zone. In FIG. 1, only one output waveguide is shown, and the input signal is efficiently transmitted to this waveguide at those wavelengths for which the image location $A_0$ coincides with the particular waveguide location. As pointed out earlier, the location of $A_0$ is a periodic function of the signal wavelength. In each period, the image varies over the entire central zone. As a result, the transmission coefficient has the periodic behavior shown in FIG. 3, consisting of equally spaced lobes 21. Each lobe corresponds to a wavelength for which the image $A_0$ coincides with the output waveguide location. The period, given by the spacing $\lambda_f$ between lobes, is called the free-spectral range. In a conventional router images produced outside the central zone are considered useless and so undesirable. Therefore, the router is generally optimized by minimizing their intensities. To this purpose, one needs to optimize the radiation characteristics of the arms, since these radiation characteristics affect the intensities of the various images. Typically, the radiating apertures of the arms are arranged periodically, thus forming a periodic array, and each aperture then produces the same radiation pattern, which is called the element pattern of the array. Maximum efficiency in the central zone is obtained by designing the array in known fashion, so that the element pattern ideally approximates a rectangular function, $$P(x) = rect\left(\frac{x}{d_0}\right) \quad \text{Equation(2)}$$

characterized by essentially unity amplitude inside the central zone and essentially zero amplitude outside. Each arm in this case radiates its entire power inside the central zone, and unwanted images outside this item zone are effectively eliminated. In practice, such a rectangular function is difficult to realize, and a simpler design is typically used, producing the power pattern $$P(x) = \frac{\pi^2}{2}\left[\frac{\cos(\pi x/d_0)}{(\pi/2)^2 - (\pi x d_0)^2}\right]^2 \quad \text{Equation(3)}$$

Figure 4:
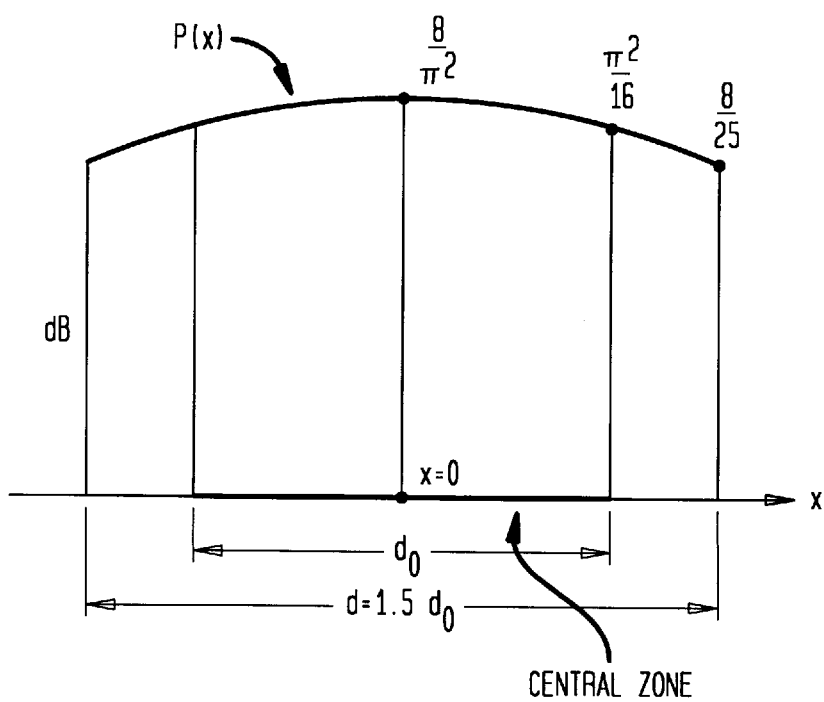

As shown in FIG. 4, this power pattern varies appreciably in the central zone and, outside this zone, it produces appreciable values in the vicinity of the boundaries of the central zone.

There is now described a technique in accordance with the invention for including, in addition to the input and output ports that are commonly used in a conventional router, other ports useful for other applications. Additional output ports may be used, for instance, to monitor the wavelength and/or power of each input signal. Similarly, additional input ports may be used to combine standard output signals with suitable telemetry signals, which are conveniently supplied to the router through the additional input ports, as proposed here. Alternatively, additional input ports can be used to combine a number of signals into time-division multiplexed signals for exit at a common output port.

Figure 5:
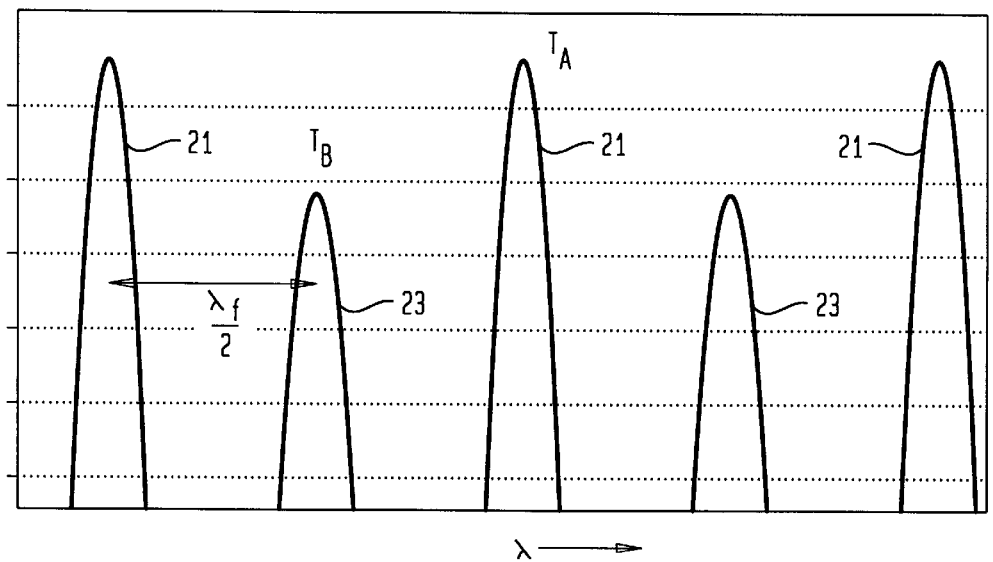
FIGS. 5 and 6 illustrate output characteristics of a wavelength router in accordance with the invention.
Figure 6:
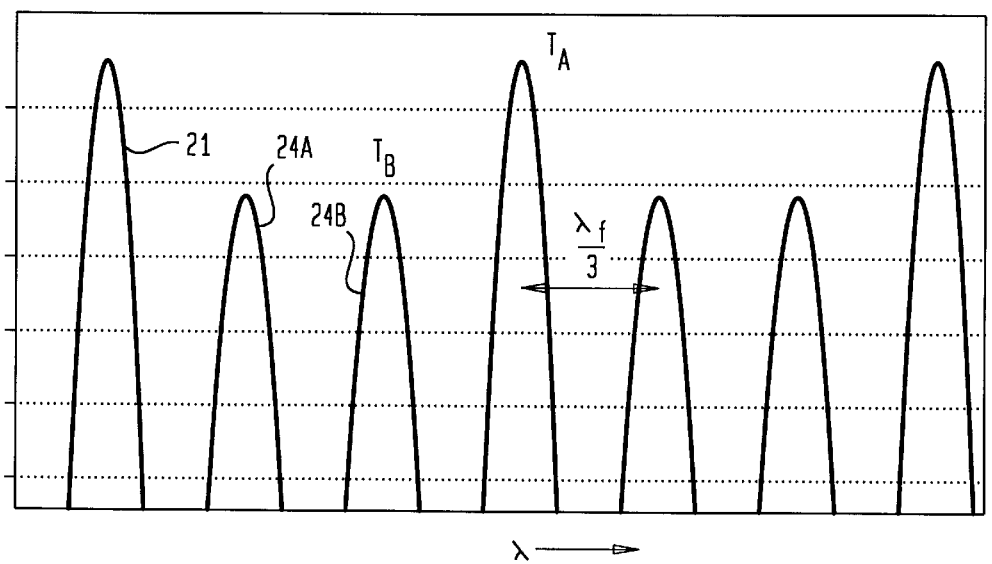
Figure 7:
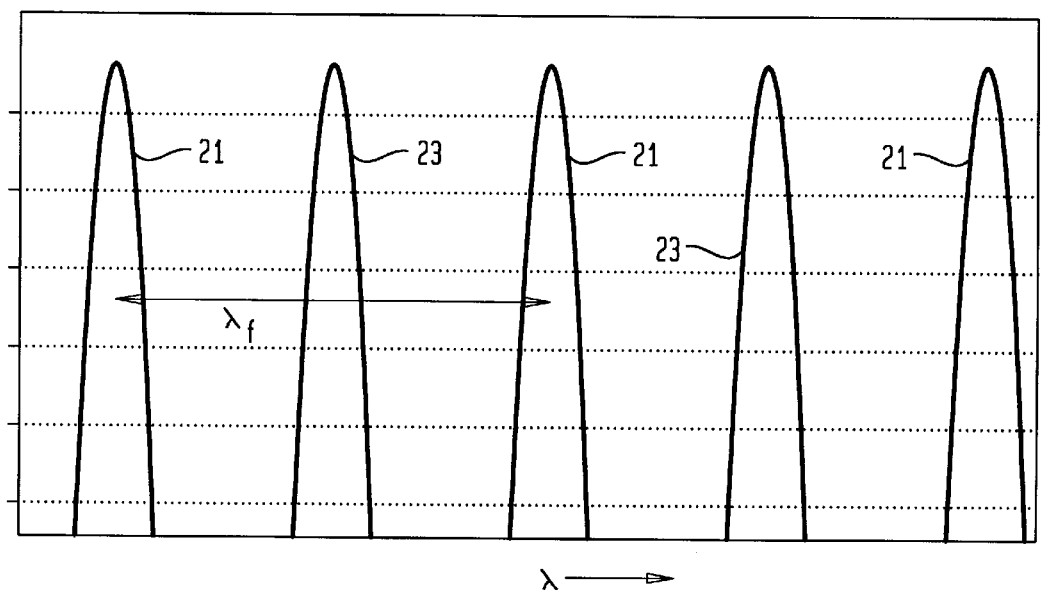
FIGS. 7 and 8 illustrate the output characteristics of a particular embodiment of wavelength routers in accordance with the invention.
Figure 8:
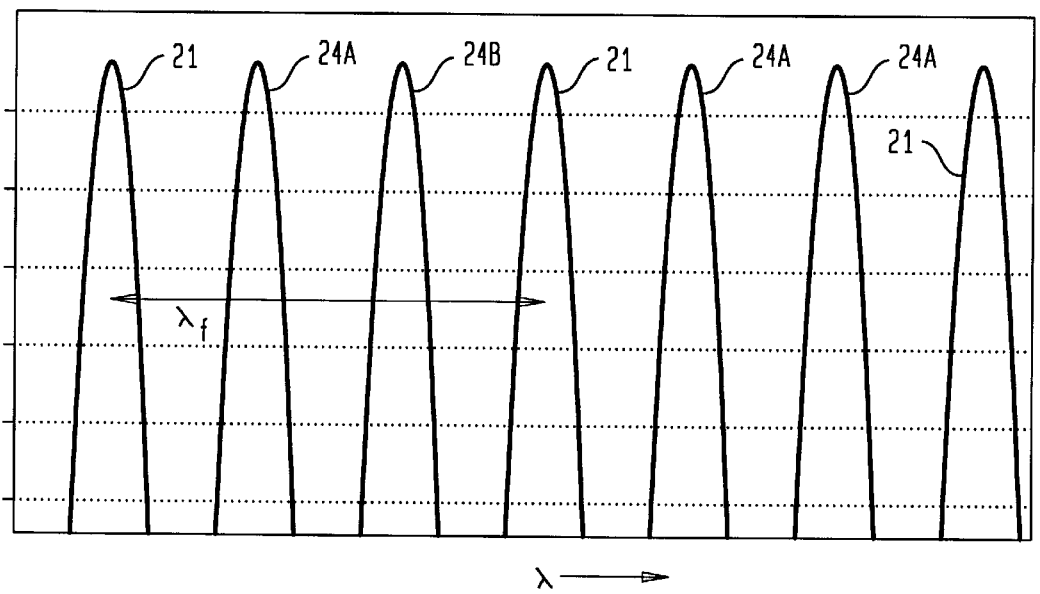
Figure 9A:
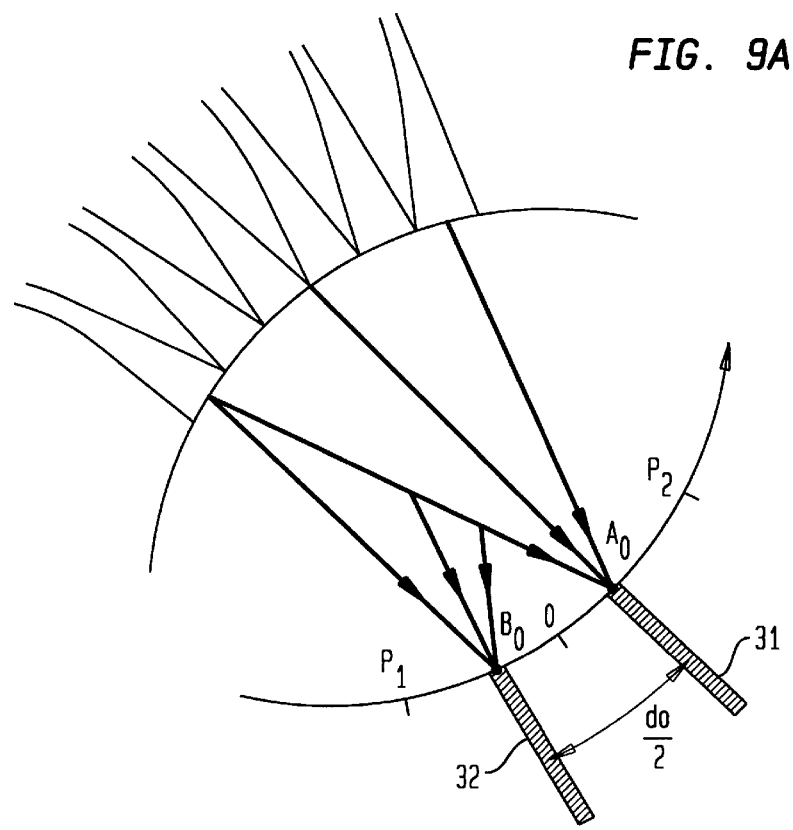
FIGS. 9A and 9B illustrate the output reference circles and the output ports to achieve the results of FIGS. 5 and 6, respectively.
Figure 9B:
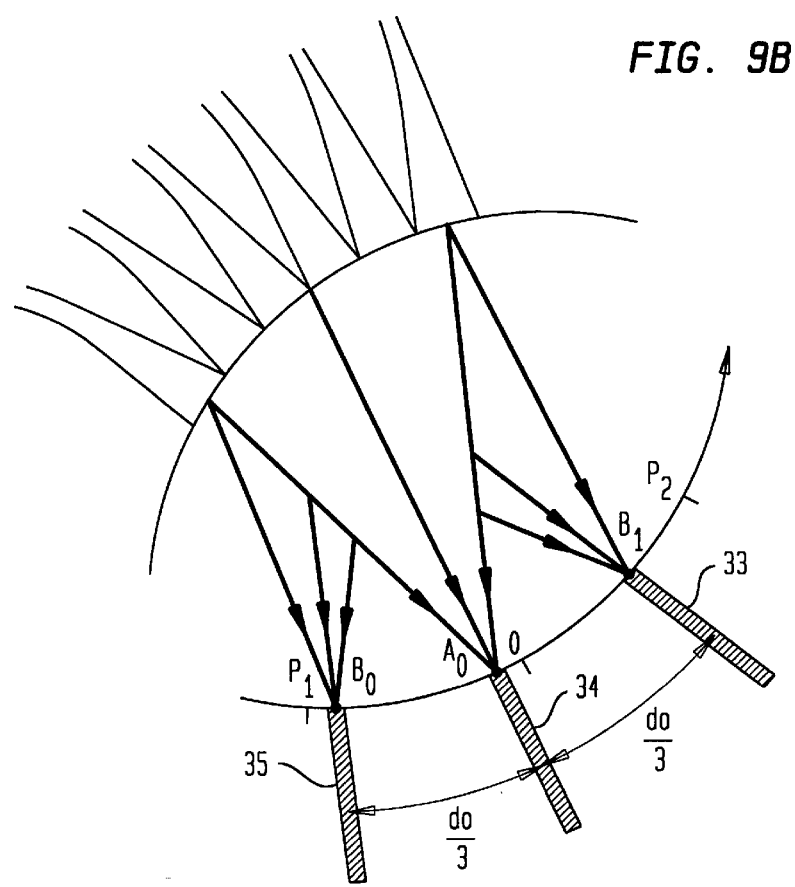

The invention provides a technique suitable for efficiently abstracting power from such ports. To this purpose, the lengths of the grating arms are modified. More particularly, the s-th phase shift, produced by the s-th arm, of the grating is changed by including the phase factor $$\exp[j\alpha \cos(2\pi s/P)] \quad \text{Equation (4)}$$

containing a sinusoidal variation with amplitude $\alpha$ and period P. Hereinafter this factor will be described as the critical phase factor. This phase variation will cause additional images, which in turn will produce additional lobes (sidelobes) in the transmission coefficient. In FIG. 5, for instance, one additional lobe 23 is shown in each period half way between the main lobes 21. In FIG. 6, two sidelobes 24A, 24B are shown added in each period. The former case is obtained by choosing the period P of the above variation so that P exactly includes the phase difference between two arms, whereas, by including three arms, one obtains the latter case. In either case, the amplitude $T_B$ of the sidelobes is determined by the amplitude of the above variation. It is therefore possible, by properly choosing $\alpha$, to cause all lobes to have the same amplitude as shown in FIGS. 7 and 8. The amplitude $\alpha$ that produces this result will be described as the equilibrating amplitude. Notice the additional lobes in FIGS. 5 and 6 cause a corresponding reduction of the amplitude $T_A$ of the main lobes. In FIG. 5, for instance, denoting by $T_0$ the value of $T_A$ for $\alpha=0$, $$T_A = T_0 \cos \alpha, T_B = jT_0 \sin \alpha \quad \text{Equation (5)}$$

and therefore one must choose $\alpha=\pi/4$ radians, or ⅛ of a wavelength, in order to obtain the equal amplitude result shown in FIG. 7. On the other hand, to obtain the results shown in FIG. 8, one must choose $\alpha=2\pi/3$ radians or ⅓ of a wavelength. The additional images producing the sidelobes of FIGS. 5 and 6 are illustrated in FIGS. 9A and 9B, respectively. Only shown in each case are the additional images of order zero, produced in the central zone. These are $A_0$, $B_0$ in FIG. 9A, and $A_0$, $B_0$ and $B_1$ in FIG. 9B. To abstract these images, one adds additional output ports 31–35 as shown in FIGS. 9A and 9B. This leads to the router 40 shown in FIG. 10 where the two ports 17, 18 of FIG. 1 are now replaced by four ports 41–44. With respect to these four ports, the router 40 behaves as a 2×2 star coupler. Thus, if a signal is applied to either one of the two input ports 41,42 at any of the wavelengths of maximum transmission shown in FIG. 7, the input signal is transmitted equally to both output ports 43, 44. In a similar fashion, a router 50 that behaves as a 3×3 coupler is obtained as shown in FIG. 11 by using three input and three outport ports 51, 52, 53 and 54, 55, 56 operated to obtain the result shown in FIG. 8.

Such an arrangement makes it feasible to combine signals of similar wavelength supplied from a plurality of input ports and divide the combined signal between a plurality of output ports. Such a function is useful in a time division multiplexed optical network.

Figure 10:
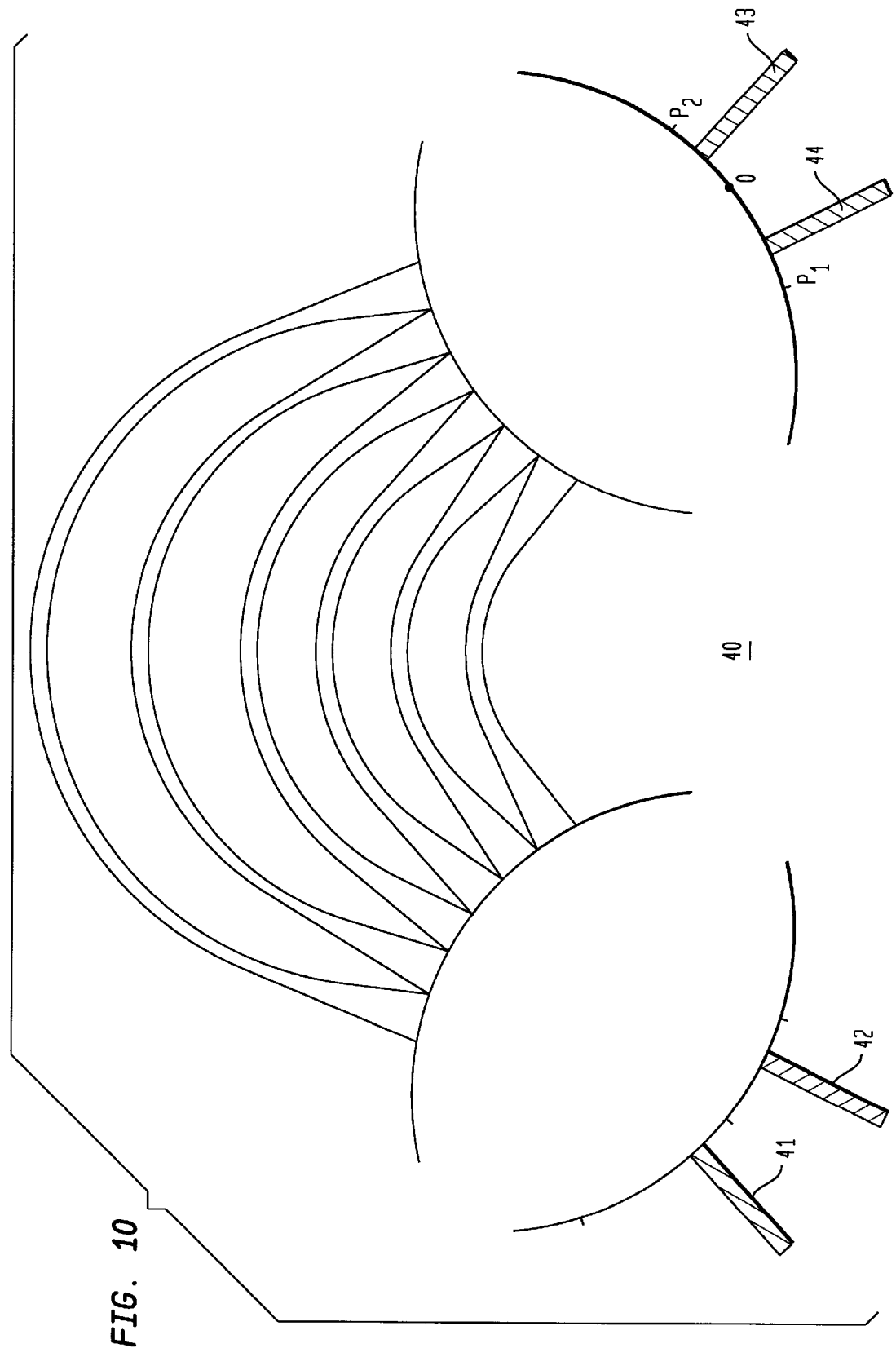
FIGS. 10 and 11 show schematically wavelength routers to achieve the output characteristics of FIGS. 5 and 6, respectively.
Figure 11:
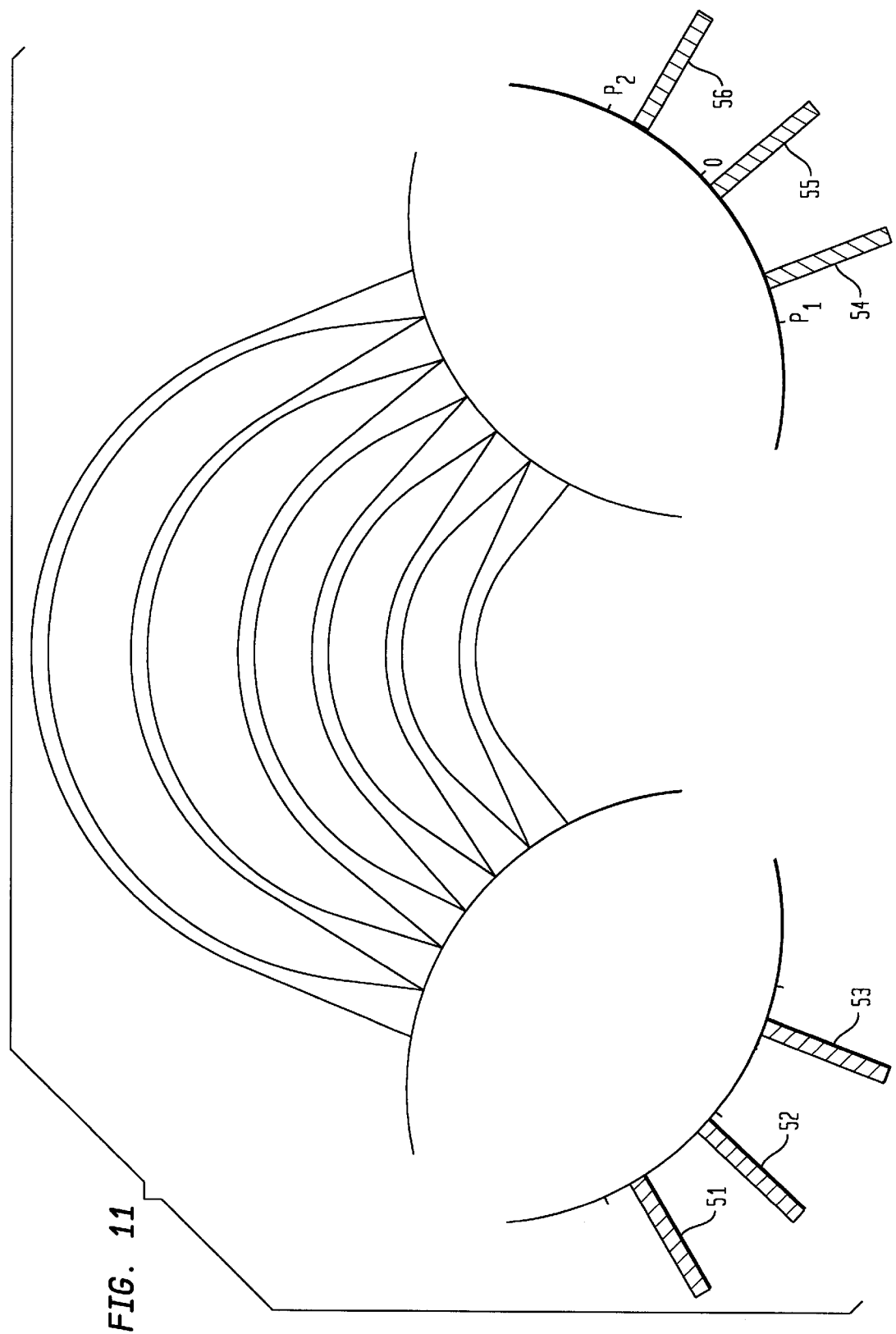
Figure 12:
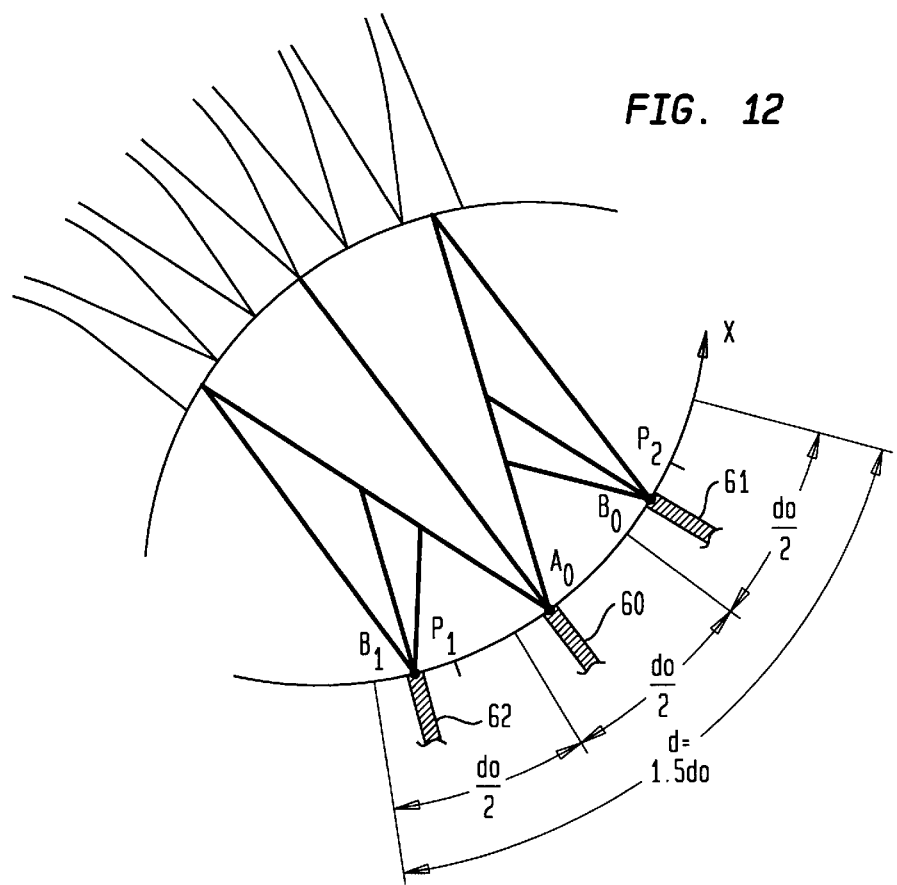
FIG. 12 shows the output circle and associated output ports for one embodiment of the invention.

The maximum efficiency in the arrangement 40 of FIG. 10 is obtained when the routers are efficiently designed so that the arms are approximately characterized by the rectangular element pattern of Equation (2). Then, the only images of significant amplitude are those of zero order and are produced in the central zone. In practice, however, the element pattern of Equation (3) is simpler to realize. With it, relatively strong images of nonzero order are produced in the vicinity of the boundaries of the central zone. For instance, the critical phase factor of Equation (4) will produce, in addition to the image $B_0$ of zero order shown in FIG. 9A, an image $B_1$ of order one, displaced by $d_0$ from $B_0$, so that $B_0$, $B_1$ are symmetrically located with respect to the primary image $A_0$, as shown in FIG. 12. The additional image $B_1$ is close to one of the two boundaries $P_1$, $P_2$ of the central zone. Therefore its amplitude is large enough to be useful for applications, such as monitoring of the signal power and wavelength, where the required signal amplitudes for the monitoring ports are relatively small. In this case, suitable signals for monitoring are obtained by simply placing two additional waveguides 61, 62 in the vicinity of the two images $B_0$, $B_1$, as shown in FIG. 12.

In particular, it is to be noted that by producing two additional images for P=2 instead of 3, the available field of view is substantially increased, by a factor 1.5. In a conventional router, the available field of view is the entire width of the central zone, and therefore the output waveguides can be placed anywhere in this zone. Instead, in FIG. 9A, the router field of view is effectively reduced by a factor P, since the additional ports occupy a fraction (P−1)/P of the central zone. Therefore, only a fraction 1/P of the central zone is left available for the primary ports, receiving the primary images $A_0$. In the arrangement discussed next, P=2 and therefore the available field of view is one half of the central zone. This should not be a significant limitation, because the element pattern of Equation (3) is only efficient in the central half of the central zone.

Figure 13:
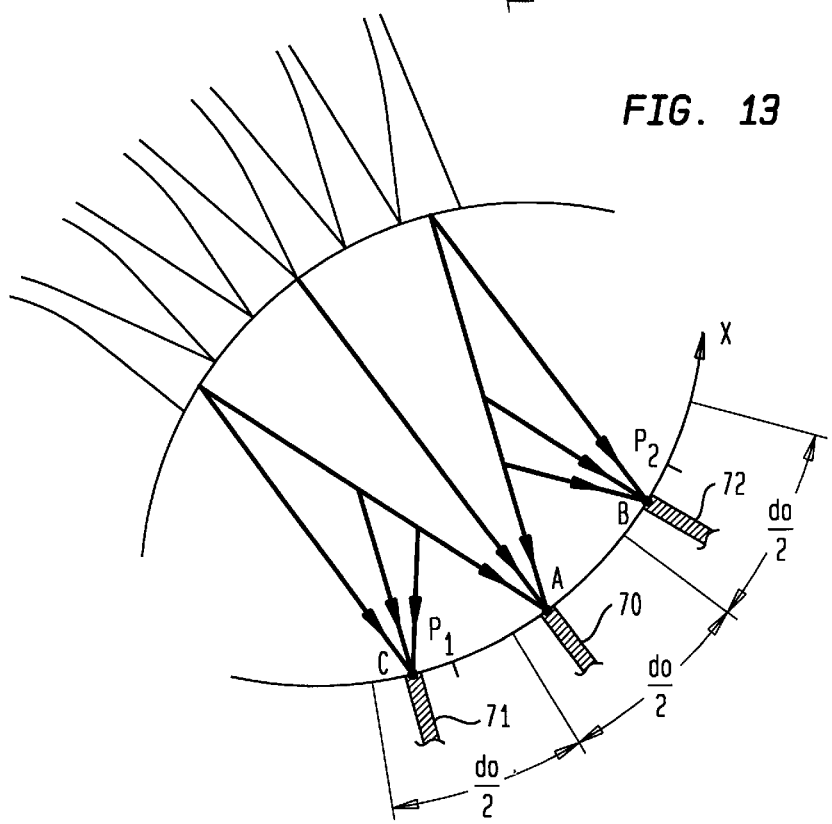
FIG. 13 shows the output circle of a wavelength router in accordance with the invention especially adapted for monitoring purposes.

Now consider the images shown in the arrangement of FIG. 13, obtained by applying to the various arms the critical phase factor. We place the primary waveguide 70, receiving the image $A_0$, in the interval $$|x| < \frac{d_0}{4} \quad \text{Equation(6)}$$

and, the waveguides 71, 72 receiving the secondary images, in the intervals $$\frac{-3d_0}{4} < x < \frac{-d_0}{4}, \frac{d_0}{4} < x < \frac{3d_0}{4} \qquad \text{Equation(7)}$$

Figure 14A:
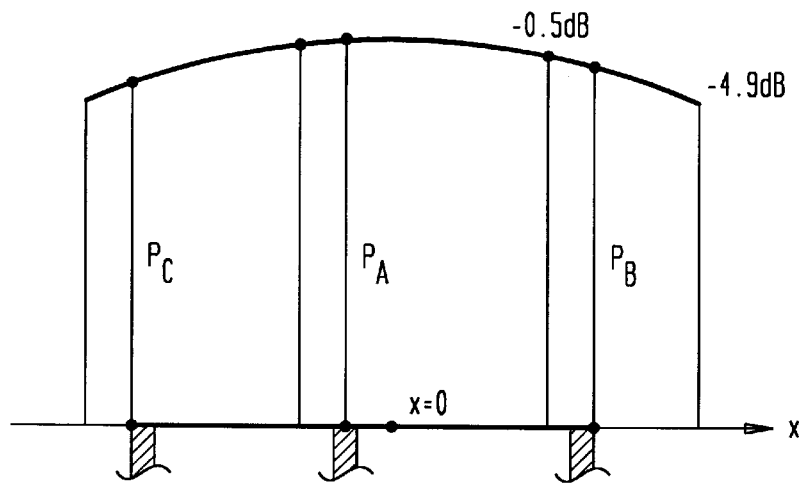
FIGS. 14A and 14B show properties of the output characteristics of the router associated with FIG. 13.
Figure 14B:
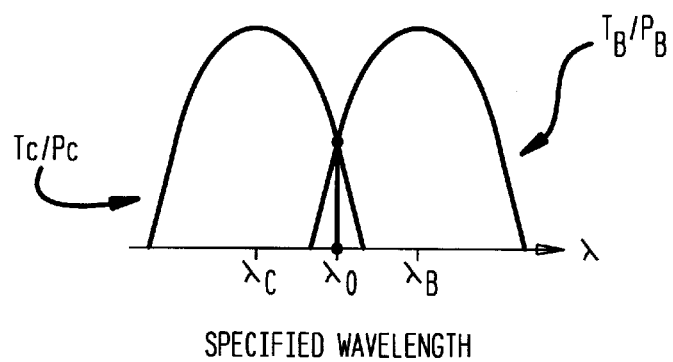

We now simplify the notation, as shown in FIG. 13, by letting A, B, C denote respectively the images produced in these three intervals. The element pattern behavior in the three intervals is shown in FIG. 14A. The intensities of the three images can be expressed in term of the intensity $I_0$ of the primary image for x=0, and they are respectively given by $$I_A = \cos^2(\alpha) P(x) I_0, \ I_B = \sin^2(\alpha) P(x - d_0/2) I_0,$$
$$I_C = \sin^2(\alpha) P(x + d_0/2) I_0, \qquad \text{Equation (8)}$$

which for x>0 satisfy $$I_A > I_B > I_C \qquad \text{Equation (9)}$$

and a similar result is obtained for x<0, by interchanging B with C. One can verify from Equation (3) that the above intensities have the important property $$I_A + I_B + I_C > P(x) \qquad \text{Equation (10)}$$

Thus, the total power exceeds the power obtained in a conventional router, without splitting the image A. The reason for this result is that here only one of the two images B, C is a primary image, produced inside the central zone, whereas the other image is outside the central zone. The latter image is displaced from the primary image by $d_0$, and it is the main cause of the loss resulting in $P(x-d_0/2)<1$ for the primary image. In practice one would like $I_B$, $I_C$ to exceed a specified value $P(0)/\xi$ for all x. Then, one must choose $$\cos^2(\alpha) \geq 1 - \frac{25}{8\xi} \qquad \text{Equation(11)}$$

For instance, by requiring $\xi=10$ we obtain $$\cos^2(\alpha) = 0.6875 \qquad \text{Equation (12)}$$

showing that the intensity of A is only reduced by 1.627 dB.

Figure 15:
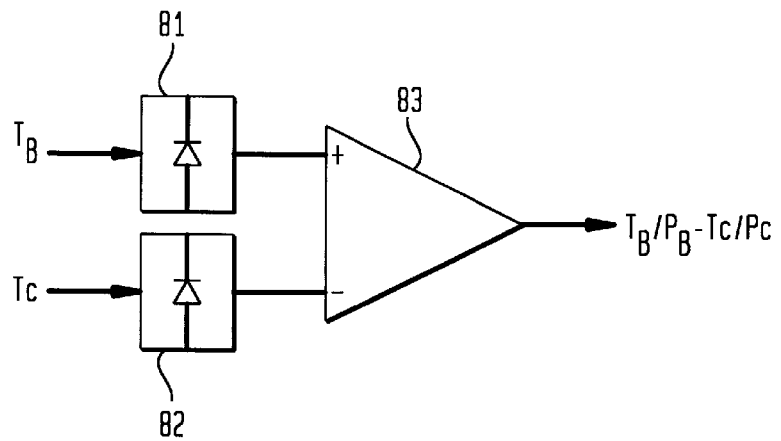
FIG. 15 shows a circuit arrangement for using the output of the router associated with FIG. 13 for frequency monitoring.

In order to determine the signal wavelength we now place in the vicinity of the two locations B, C of FIG. 13 two output waveguides 71, 72 slightly displaced from these locations, so as to obtain maximum transmission at two slightly displaced wavelengths $\lambda_B$, $\lambda_C$ as shown in FIG. 14A. By then using two photodiodes 81, 82 followed by a differential amplifier 83 as shown in FIG. 15, we obtain an error signal providing a measure (with appropriate sign) of the wavelength error with respect to the specified wavelength $\lambda_0 = 1/2(\lambda_B + \lambda_C)$. In conventional fashion, this error signal can be used to vary the signal of the laser in a direction to reduce the error signal to zero.

Figure 16:
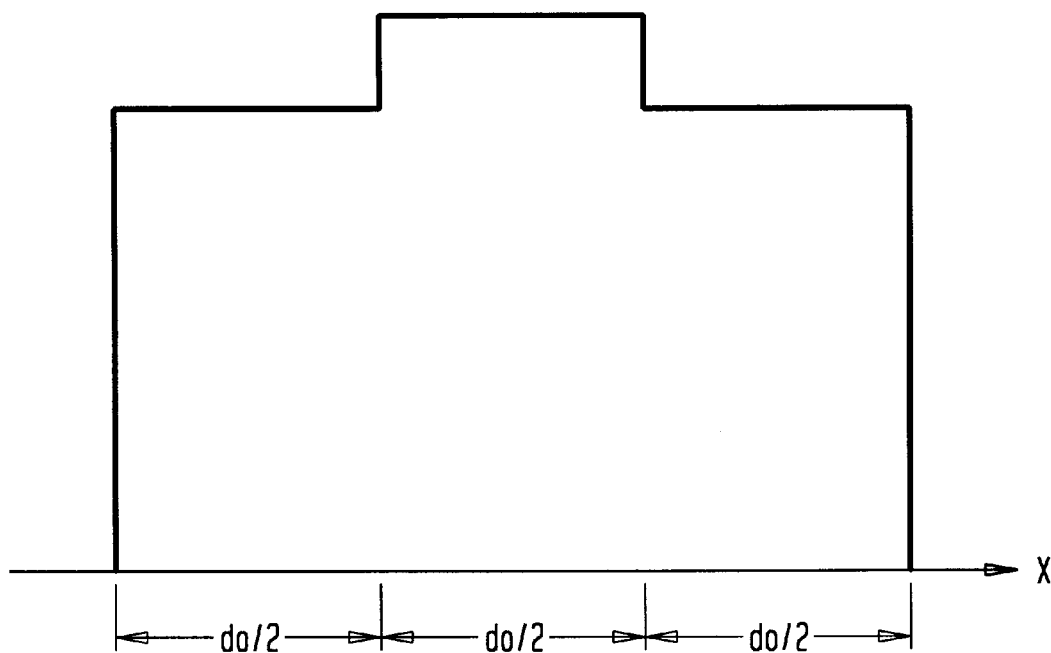
FIG. 16 illustrates the ideal element pattern behavior of one form of wavelength router in accordance with the invention.

In the above example we chose $\alpha = \pi/2$ for the following reason. Typically, the router is only efficient in a region appreciably smaller than the central zone. The output waveguides are usually placed in this region, and the rest of the output circle is available for monitoring. As pointed out earlier, an attractive possibility is P=3. Then each of the three images occupies one third of the central zone and, by designing the router so that the element patter P(x) is approximately a rectangular function of width $d_0$, $$P(x) = \text{rect}\left(\frac{x}{d_0}\right) \qquad \text{Equation(2)}$$

the entire output power (radiated by the arms) is transferred to the three images, and their intensities are independent of their locations A, B, C. However, as stated earlier, an undesirable feature of such a router is its relatively large size, since only one third of the central zone is used by each image. For this reason, by choosing $\alpha = \pi/2$ in the example, we increase the available field of view by 1.5 times. As pointed out earlier, the behavior of P(x) can be improved by modifying the design so as to approximate the ideal behavior illustrated in FIG. 16.

For some applications wavelength monitoring may not be required, and only one of the two images B, C will then be needed, to monitor the signal power. It will then be convenient to choose the primary image, with intensity given for x>0 by $$I_B = \sin^2(\alpha) P(x - d_0/2) \qquad \text{Equation (13)}$$

Then maximum efficiency is obtained by maximizing the element pattern behavior in the central zone.

Figure 17:
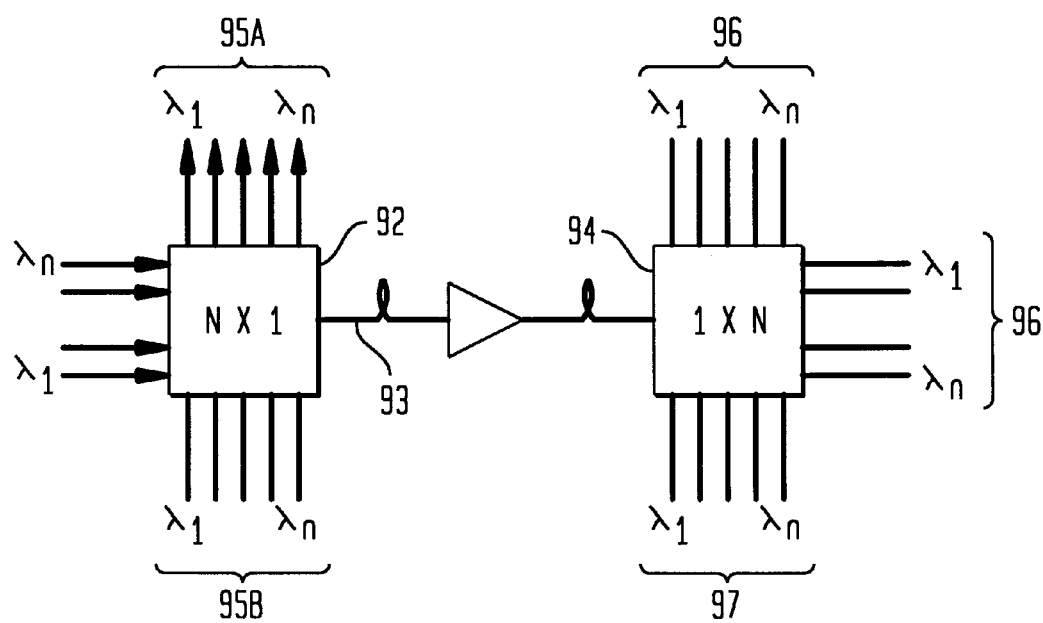
FIG. 17 illustrates the use of a wavelength router in accordance with the invention for monitoring a frequency multiplexed transmission network.

FIG. 17 illustrates a wavelength division optical network 90 that employs a pair of optical routers of the kind described for a variety of functions. At the transmitting terminal, the router 92 is used for multiplexing N input signals, each of a different wavelength, each supplied to its dedicated input port for combining in a single output port 93 for transmission to the receiving terminal for demultiplexing by a router 94. Router 92 also includes a set 95A of output ports that are used to provide samples for use in controlling the wavelength of the lasers that serve as the sources of the different wavelengths involved and a set 95B to provide samples for use in amplitude control of the various signal levels. Additionally the router 94 includes both a set of output ports 96 that provide connection to the appropriate transmission path for each output signal and a set of ports 97 that can be used for level control or wavelength control of the output signals.

It should be understood that the specific embodiment described are merely illustrative of the general principles of the inventions and various modifications may be made without departing from the spirit and scope of the invention. In particular the principles could be extended to optical networks that involve wavelength-division multiplexing for providing a plurality of channels of different wavelengths.

Obviously, the above technique can also be incorporated in a multiwavelength laser using a waveguide grating.

What is claimed:

1. A wavelength router including a slab for forming an input free space region and a slab for forming an output space region coupled together by a grating including a succession of waveguide arms characterized in that the phase shift between successive waveguide arms contains a periodic variation designed to create side lobes in the output free-space region and at least one output port is included in the output free space region to receive at least one side lobe created by the periodic variations.

2. A wavelength router in accordance with claim 1 in which the periodic variation is a sinusoidal variation with amplitude $\alpha$ and period P described as the critical phase factor.

3. A wavelength router in accordance with claim 2 in which the period P corresponds to two consecutive arms of the grating for dividing the input signal power essentially equally between two output ports.

4. A wavelength router in accordance with claim 2 in which the period P corresponds to the three successive arms of the grating for dividing the input signal power essentially equally between three output ports.

5. A wavelength router in accordance with claim 4 in combination with circuit means for utilizing the side lobe power abstracted to produce error signals for stabilizing the wavelength of that power.

6. A wavelength router comprising an input star coupler and an output star coupler and a waveguide grating connected therebetween having an array of waveguide arms, characterized in that the length of successive waveguide arms of the grating contain a periodic component designed to form a radiation pattern that has at least one side lobe inside the central zone of the output star coupler and there is an output port connected to the output star coupler to abstract said side lobe.

7. A wavelength router comprising an input star coupler and an output star coupler and a waveguide grating connected therebetween, a pair of input ports connected to the input star coupler and a pair of output ports connected to the output star coupler, characterized in that the phase shifts of the waveguide arms of the grating vary by a phase factor containing an essentially sinusoidal variation such that the power supplied at each of the two input ports at a specified wavelength is divided in a prescribed manner between the two output ports.

8. A wavelength router in accordance with claim 7 in which the phase factor is such that the power supplied at each of the two input ports at a specified wavelength is divided equally between two output ports.

9. A wavelength router comprising an input star coupler and an output star coupler and a waveguide grating connected therebetween, three input ports connected to the input star coupler and three output ports connected to the output star coupler characterized in that the phase shift of the waveguide arms of the grating vary by a phase factor containing an essentially sinusoidal factor whereby energy supplied at a given wavelength in each of the input ports is divided in a prescribed manner among the three output ports.

10. A wavelength router in accordance with claim 9 in which the phase factor is such that the energy in each of the three input ports supplied at a given wavelength is divided equally among the three output ports.

* * * * *